United States Patent [19]

Bell

[11] 3,726,960
[45] Apr. 10, 1973

[54] SODIUM ALUMINUM PHOSPHATE CHEESE EMULSIFYING AGENT

[75] Inventor: Russell N. Bell, Ardsley, N.Y.

[73] Assignee: Stauffer Chemical Company, New York, N.Y.

[22] Filed: May 6, 1970

[21] Appl. No.: 35,268

[52] U.S. Cl. ................................. 423/306, 99/117
[51] Int. Cl. ...................... C01b 15/16, C01b 25/26
[58] Field of Search ..................... 23/105, 106, 107, 23/50; 99/117; 423/304–316

[56] References Cited

UNITED STATES PATENTS

| | | | |
|---|---|---|---|
| 3,244,535 | 4/1966 | Lauck et al. | 99/117 |
| 3,311,448 | 3/1967 | Blanch et al. | 23/105 |
| 3,337,347 | 8/1967 | Kichline et al. | 99/117 |
| 3,097,949 | 7/1963 | Lauck et al. | 99/115 |
| 3,223,479 | 12/1965 | Vanstrom | 23/107 |
| 3,223,480 | 12/1965 | Vanstrom | 23/107 |
| 3,574,536 | 4/1971 | Vanstrom | 23/107 |

*Primary Examiner*—Oscar R. Vertiz
*Assistant Examiner*—Gregory A. Heller
*Attorney*—Wayne C. Jaeschke, Martin Goldwasser and Daniel S. Ortiz

[57] ABSTRACT

The invention provides a composition which is useful as a cheese emulsifying agent, and the process for making the same. The composition has the empirical formula:

$$Na_8 Al_2(OH)_2(PO_4)_4$$

4 Claims, No Drawings

SODIUM ALUMINUM PHOSPHATE CHEESE EMULSIFYING AGENT

This invention relates to a composition which is useful as a cheese emulsifier, a process for preparing the same, and to process cheese formulations containing the same. More particularly, this invention relates to a sodium aluminum phosphate composition of relatively high sodium content.

There are several phosphate materials known as cheese emulsifiers such as disodium orthophosphate, trisodium phosphate, and the like. However, these materials all have serious limitations as cheese emulsifiers and therefore cannot always be used to the extent desired for cheese emulsification. For Example, disodium orthophosphate is generally satisfactory as a cheese emulsifier below 1.6 percent (based on the total weight of cheese) but when used in greater amounts, hydrated crystals of the phosphate form which is, accordingly, quite objectionable. More recently, sodium aluminum phosphates have been combined with other phosphates such as disodium orthophosphate to form useful compositions for emulsifying cheese which minimize the tendency to crystallize even when used in levels up to about 3 percent.

It has been found in accordance with the present invention, that a new sodium aluminum phosphate composition of relatively high sodium content can be prepared. This new phosphate composition, of relatively high sodium content, has as a cheese emulsifier, the recognized advantages of sodium aluminum phosphates and in addition imparts to cheeses the quality of maintaining their melt properties over a long period of time.

The sodium aluminum phosphate of the present invention can be characterized by the following empirical formula:

$$Na_8 Al_2(OH)_2 (PO_4)_4$$

Hereinafter the phosphate will be referred to as a (8:2:4) phosphate composition.

The sodium aluminum phosphate can be prepared either by crystallization from solution, or by a total evaporation process. The phosphate produced by either process exhibits an X-ray pattern having characteristic lines.

When placed in water, this (8:2:4) phosphate composition disproportionates, forming a soluble and an insoluble fraction. The rate of disproportion and formation of the soluble fraction varies with the temperature of the water. The (8:2:4) phosphate composition will generally have a water-soluble fraction between about 40 and 55 weight percent.

The following approximate percentages of solubles develop when the 8:2:4 phosphate product is kept in water at ± 90° C. for 1 to 5 days.

| Period (days) | Solubility (%) |
|---|---|
| 1 | ± 20 |
| 2 | ± 30 |
| 3 | ± 40 |
| 4 | ± 44 |
| 5 | ± 47 |

The novel reaction product of the present invention is generally prepared by reacting aluminum phosphate with an alkaline solution of sodium phosphate. The aluminum phosphate may be either an acidic solution of monoaluminum phosphate, $Al(H_2PO_4)_3$, or a thick slurry of freshly precipitated aluminum phosphate, $AlPO_4$.

It may also be prepared from sodium aluminate and an acidic sodium phosphate.

The (8:2:4) phosphate composition, is formed when the crystallization temperature is high, preferably near 100° C. If the temperature is considerably lower, such as about 30° C., an entirely different phosphate composition is formed. Such a phosphate composition would be a (4:3:3) phosphate composition as described in my copending application, Ser. No. 35,271 filed, May 6, 1970.

X-ray studies of the novel reaction product, as indicated hereinabove, show the presence of a unique x-ray pattern. The X-ray patterns obtained were relatively intense and sharp.

The (8:2:4) phosphate composition produced by both the crystallization and total evaporation process, exhibits an x-ray powder diffraction pattern whose principal lines are at approximately 4.77, 3.57, 2.63, 2.56, and 2.51 angstroms.

The crystallization process for preparing the (8:2:4) phosphate composition, comprises initially reacting aluminum hydrate with a slight excess of hot (100° C.) phosphoric acid solution. After cooling, this monoaluminum phosphate solution is diluted and added slowly with good agitation to a strong hot (70° to 100° C.) alkaline sodium phosphate solution.

The alkalinity of the sodium phosphate solution is such that the final pH (2 milliliters diluted to 150 milliliters) will be between 10.5 and 11.5, after the addition of the monoaluminum phosphate solution.

The liquor is kept hot, preferably above 90° C., and agitated until crystallization is complete.

The reaction product is filtered off and washed quickly, first with water at room temperature, and then with acetone. The crystals are then dried at 50° to 60° C. with the dry product resulting.

The components used in the crystallization preparation of the (8:2:4) phosphate composition are generally in the following amounts: between about 125 and 150 grams of phosphoric acid (75%); between 15 and 25 grams of aluminum hydroxide; between 375 and 450 grams of disodium phosphate; between about 200 and 250 grams of sodium hydroxide, and the remaining portion of the mixture being water in the quantity of between about 1,000 to 2,000 grams, depending upon the amounts of the other components mixed.

The yield may be as high as 99 percent, based on the aluminum added.

The total evaporation process for preparing the (8:2:4) phosphate composition comprises initially dissolving anhydrous disodium phosphate in an aqueous solution of phosphoric acid (85%). The solution is then heated to approximately 75° to 90° C. After being heated, the solution is mixed with sodium aluminate. This mixture is then dried to remove essentially all the water content, and results in a dried phosphate composition.

The alkalinity of the resulting phosphate composition is such that a 1 percent dispersion has a pH between about 10 and 11.

The (8:2:4) phosphate composition produced according to this invention has exhibited good qualities.

For example, as a cheese emulsifying agent, it has provided improved properties in process cheese such to stabilize cheese compositions to which it is added. Also, the phosphate composition has shown some melt increase after 9 days storage and was approximately equivalent to disodium phosphate after 42 days storage either at 50° C. or at refrigerated temperatures.

The following specific examples illustrate the processes of the present invention and aluminum phosphate reaction products prepared thereby.

EXAMPLE 1

Preparation of (8:2:4) Sodium Aluminum Phosphate by Crystallization

A first solution (A) was prepared by stirring 243 grams of CP50% sodium hydroxide into 1,400 milliliters of distilled water in a 2,000 milliliter pyrex beaker. 400 grams of anhydrous disodium phosphate ($Na_2HPO_4$) was then added and dissolved. A second solution (B) had previously been prepared by adding slowly while stirring, 18.2 grams of 200 mesh aluminum hydrate (C–31) to 143 grams of hot (100° C.) 75% phosphoric acid. Solution (A) already warm, was heated to 90° C. Solution (B) was diluted with 100 milliliters of distilled water and added slowly to Solution (A) while stirring. Two milliliters of the resulting solution diluted to 150 milliliters had a pH of about 10.8.

The hot solution (mixture of A and B solutions) was filtered through a coarse fritted glass filter and transferred to a 5,000 milliliter 3-neck flask fitted with a heating mantle, reflux condenser, and mechanical stirrer. It was held at 95° to 100° C. and stirred for three days while crystallizing. The resulting slurry was cooled to about 50° C., and filtered with vacuum on a coarse fritted glass filter. Two milliliters of the filtrate diluted to 150 milliliters had a pH of about 11.2. The crystals were washed quickly several times with cool distilled water, then with a 10% acetone solution. They were then reslurred in 95% acetone. The slightly damp product was finally dried overnight under vacuum at about 55° C.

The dried product weighed 111 grams. This represents a 99 percent yield based on the aluminum oxide. The product had the following analysis:

| | |
|---|---|
| $Na_2O$ | 36.5% |
| $Al_2O_3$ | 15.5% |
| $P_2O_5$ | 41.9% |
| Loss on ignition | 6.6% |

EXAMPLE 2

Preparation of (8:2:4) Sodium Aluminum Phosphate by Total Evaporation 162 grams of anhydrous disodium phosphate was dissolved in a solution of 72 grams of 85% phosphoric acid in 450 ml. of distilled water. This solution was heated to approximately 80° C. and added slowly with good agitation to 102 grams of reagent grade sodium aluminate. The slurry thus formed was dried by pouring it onto a stainless steel surface preheated to approximately 150° C. The dried product was removed from the stainless steel surface and dried overnight at 102° C.

The final product had the following analysis:

| | |
|---|---|
| $Na_2O$ | 35.8% |
| $Al_2O_3$ | 15.0% |
| $P_2O_5$ | 41.6% |
| Loss on ignition | 8.4% |
| pH on 1% suspension | 10.3 |

What is claimed is:

1. A sodium aluminum phosphate composition useful as a cheese emulsifier, said composition having the empirical formula:

$$Na_8Al_2(OH)_2(PO_4)_4$$

and which exhibits X-ray diffraction lines of major intensity at d-spacings of 4.77, 3.57, 2.56 and 2.51 angstroms.

2. A phosphate composition according to claim 1, wherein said composition when placed in water disproportionates to give an soluble fraction of between about 40 and 55 weight percent of the phosphate composition.

3. A method for preparing a sodium aluminum phosphate composition having the empirical formula:

$$Na_8Al_2(OH)_2(PO_4)_4$$

which comprises, forming a first reaction mixture by reacting aluminum hydrate with an amount of phosphoric acid in excess of that required to react the aluminum hydrate to monoaluminum phosphate; forming a second reaction mixture by adding the first reaction mixture to an agitated alkaline sodium phosphate solution in an amount such that the final pH of 2 milliliters of the second reaction mixture diluted to 150 milliliters is between about 10.5 to about 11.5; maintaining the temperature of the agitated second reaction mixture at above 90° C. to precipitate a composition having an atomic ratio of sodium: aluminum:phosphorus of 8:2:4 recovering said precipitated composition said reactants supplied in amounts between about 125 to 150 parts phosphoric acid based on 75 by weight phosphoric acid, between about 15 to about 25 parts aluminum hydroxide, between about 375 and about 450 parts disodium phosphate, between about 200 and 250 parts sodium hydroxide based on 50 percent by weight sodium hydroxide and between about 1,000 to about 2,000 parts water.

4. A method for preparing a composition having the empirical formula:

$$Na_8Al_2(OH)_2(PO_4)_4$$

which comprises forming a reaction mixture having an atomic ratio of sodium:aluminum:phosphorus of 8:2:4 by reacting disodium phosphate, phosphoric acid and sodium aluminate at a temperature at about 80° C. and drying the reaction mixture at a temperature between 80°–110° C. to recover a composition having the empirical formula:

$$Na_8Al_2(OH_2)(PO_4)_4$$

* * * * *